Feb. 27, 1945. J. RODWAY 2,370,582
MEANS FOR CONTROLLING BRAKES ON TRAILER VEHICLES
Filed Jan. 7, 1943 3 Sheets-Sheet 2

Inventor
JOHN RODWAY
By
Attorneys

Patented Feb. 27, 1945

2,370,582

UNITED STATES PATENT OFFICE 2,370,582

MEANS FOR CONTROLLING BRAKES ON TRAILER VEHICLES

John Rodway, Lincoln, England

Application January 7, 1943, Serial No. 471,623
In Great Britain February 17, 1942

4 Claims. (Cl. 303—22)

This invention relates to means for controlling the brakes on trailer vehicles and to the kind wherein the effort applied through vacuum assisted servo brake devices on a tractor vehicle is transmitted also to the brake operating mechanism of a trailer vehicle.

The invention has particular reference to control devices which operate to transmit a lesser braking effort when the trailer is unladen than when it is loaded, and it is the object of the invention to provide an improved control device for this purpose which is of simple and robust construction and which is particularly adapted for use in the direct or single acting vacuum systems used on heavy motor vehicles.

According to the invention there is provided a control device comprising a valve housing connected to a source of vacuum on the tractor vehicle and to the trailer brake applying means and a pair of connected diaphragms of differential areas mounted within said housing and controlling the operation of valve elements in such manner that, when the trailer is unladen, a degree of vacuum is transmitted to the trailer brake actuating means which is a predetermined proportion of the vacuum in the main or service line, wherein the whole of the movable valve components are carried by or directly actuated by the diaphragm assembly, hand operated means being provided, adapted to be used when the trailer is loaded, for moving the said assembly to and holding it in a position in which the valves are set to allow the whole of the available vacuum in the service line to be transmitted to the trailer brake actuating means.

Figure 1:
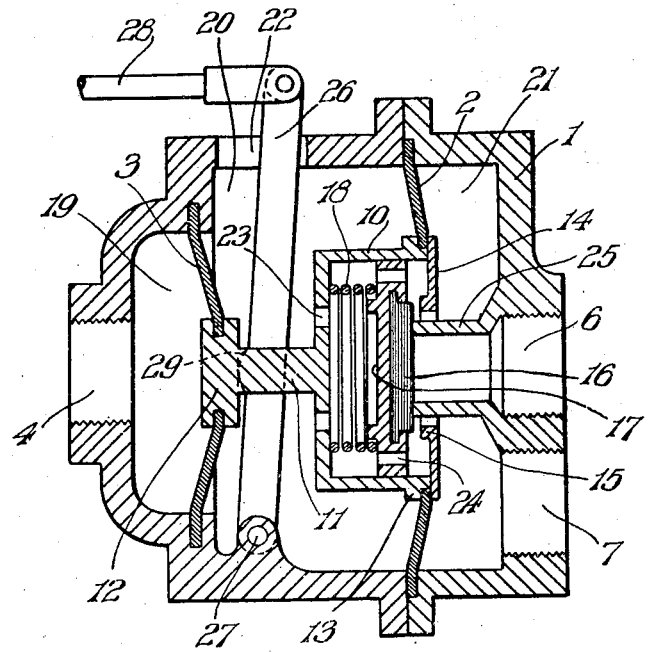

Reference will now be made to the accompanying drawings which illustrate a construction according to the invention and in which:

Fig. 1 is a sectional elevation of a control valve for trailer brake mechanism with the parts in the brakes "off" position when the vehicle is unladen.

Figure 2:
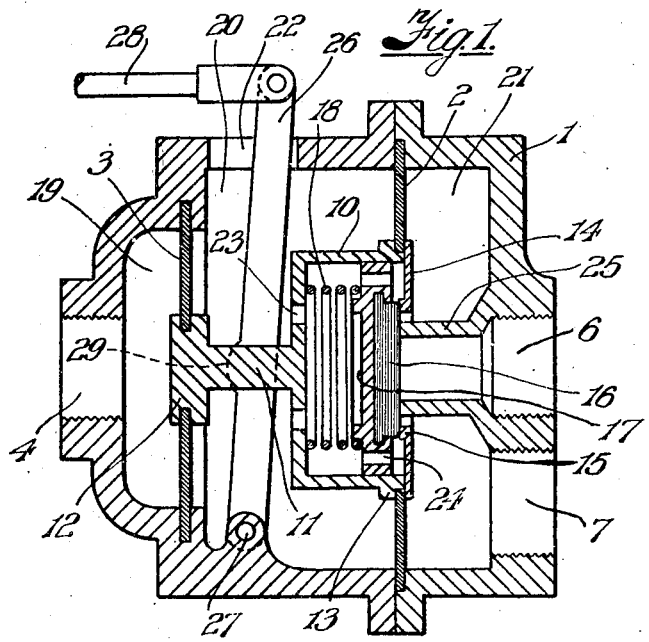
Figure 3:
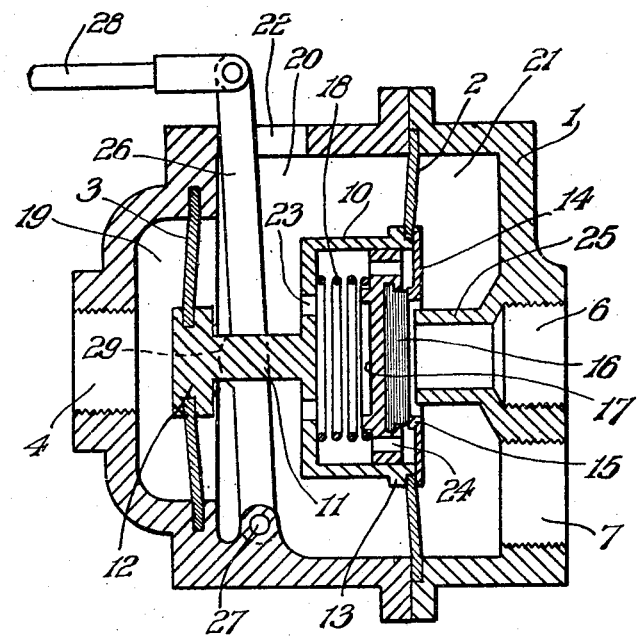
Figure 4:
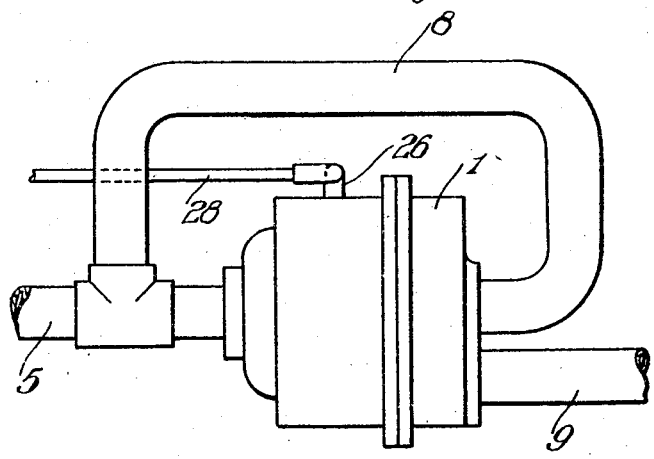
Figure 5:
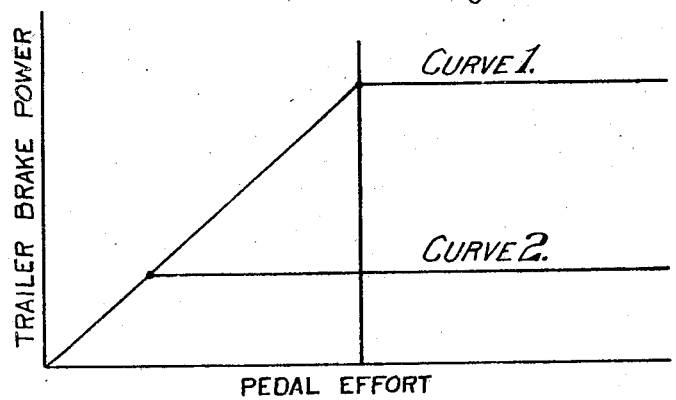
Figure 6:
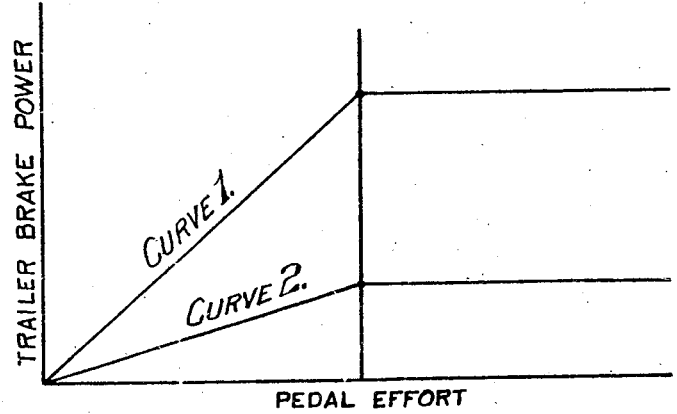

Fig. 2 is a sectional elevation similar to Fig. 1, but showing the operative position of the parts when the trailer vehicle is unladen, Fig. 3 is a sectional elevation showing the operative position of the parts when the trailer vehicle is loaded, Fig. 4 is an external elevation showing the control connections, Fig. 5 is a diagram showing the relations between pedal effort and trailer brake power under conditions hitherto prevailing and Fig. 6 is a diagram to illustrate the relation between pedal effort and trailer brake power when the control according to the invention is used.

In the construction illustrated and referring first to Fig. 1, a casing 1 contains two annular diaphragms 2 and 3 of differential areas the ratio between which is determined by the ratio between the light and loaded weights of the trailer vehicle to which the invention is applied.

The casing 1 has a port 4 adapted to communicate with a source of vacuum on the tractor vehicle, the connection to which is shown at 5 in Fig. 4. The casing 1 has also ports 6 and 7, the port 6 also communicating with the conduit 5 by way of a pipe 8 and the port 7 communicating with the trailer brake cylinders by way of a conduit 9 shown in Fig. 4. The two diaphragms 2 and 3 are connected at their central portions to a valve component 10 which is in the form of a cylinder having a stem 11 and flange 12 within the periphery of which the diaphragm 3 is mounted.

The inner edge of the diaphragm 2 is clamped between a flange 13 on the valve component 10 and an annular seating 14 also secured to said component and having a beading or flange 15 formed on its inner edge which is adapted to co-operate with a valve member 16 carried in a disc 17 movably mounted within the cylinder 10, and normally urged towards the seating 15 by a spring 18.

The diaphragms 2 and 3 in co-operation with the valve component 10 divide the interior of the casing 1 into three compartments 19, 20 and 21 the middle compartment 20 being always open to atmosphere through a port 22 while the valve cylinder 10 has ports 23 and the disc 17 has ports 24. The valve member 16 is also adapted to seat on the inner end of a tubular seating 25 which surrounds concentrically the vacuum port 6. Within the central chamber 20 is mounted an adjusting lever 26 pivotally mounted at 27 in one wall of the casing 1 and extending through the port 22 where it is linked by a rod 28 with a hand control disposed adjacent the driver's seat on the tractor vehicle. The lever 26 is forked to pass around the stem 11 and has a projection 29 adapted to be brought into engagement with the flange 12.

The operation of the device above described is as follows:

Fig. 1 shows the parts in the positions which they occupy when the brakes are in the "off" position, the valve 16 closing the port 6 and the chambers 20 and 21 being open to atmosphere by way of ports 23 and 24 and the space which separates the seating 15 from the valve member 16. When the brakes are to be applied and the trailer vehicle is unladen, a vacuum control valve on the tractor vehicle is operated so that vacuum is applied simultaneously to the chamber 19 and port 6. The vacuum acting on diaphragm 3 causes this diaphragm to move outwards so that the cylinder 10 and seating 15 are drawn towards the left and the said seating makes contact with valve member 16. As this movement continues, the valve member 16 is lifted off its seating 25 thus disconnecting chamber 21 to vacuum. As soon as the vacuum load on the diaphragm 2 is equal to the vacuum load on diaphragm 3, the diaphragms 2, 3 and cylinder 10 move slightly to the right, bringing the valve member 16 into contact with both seats 15 and 25 as shown in Fig. 2 and the elements will remain in this position until the vacuum operating through port 4 is varied. Under these conditions, the vacuum in chambers 19 and 21 will be in the inverse proportion of the ratio of the effective areas of the diaphragms 2 and 3. By the operations above described the vacuum after operating over a short time through the port 7 is cut off by the seating of valve member 16 with the result that less braking effort is utilised for the actuation of the brakes than would be the case if free and unrestricted vacuum operated through the port 7 and conduit 9. When the vacuum control valve is returned to the release position, the vacuum in chamber 19 is destroyed thus allowing the vacuum in chamber 21 to draw the seating 14, 15, away from the valve 16 so that air can pass through ports 23 and 24 and destroy the vacuum in chamber 21 and the parts return to the positions shown in Fig. 1 with corresponding release of the brake effort.

When the trailer vehicle is loaded, the hand control lever 26 is moved to the position shown in Fig. 3 thereby drawing the valve component 10 and all its associated parts towards the left and holding the valve member 16 away from the seating 25. Thus, direct communication is obtained and maintained between ports 6 and 7 so that the vacuum applied through conduits 5 and 8 is passed on to the trailer brake applying mechanism undiminished in degree.

Referring now to Fig. 5, curve 1 shows the relation between pedal effort and trailer brake power on a trailer vehicle operating under normal conditions using a simple reduction valve in the connections between tractor and trailer vehicles. Curve 1 in Fig. 5 represents conditions when the trailer is loaded, but when the reduction valve is in operation and the trailer is unloaded curve 2 is produced.

Fig. 6 illustrates similar curves obtained by using the valve according to the present invention, curve 1 corresponding to the loaded condition of the trailer vehicle and curve 2 corresponding to the unloaded condition. By comparing Figs. 5 and 6 it will be seen that whereas the total braking in the unladen condition in Fig. 5 can be the same as that in Fig. 6 yet the pedal effort range corresponding to maximum braking when unladen is very much greater when the present invention is used. This represents a considerable improvement in controllability of the unladen vehicle.

I claim:

1. A device for operating the brakes of a trailer vehicle, comprising a valve housing adapted to be connected to a source of vacuum on a tractor vehicle, means for connecting said valve housing to trailer brake applying means, a pair of connected diaphragms of differential areas mounted within said housing, a movable valve component connected to said diaphragms and providing a valve seat, a valve element movable within said component and adapted to cooperate with said seat, a second and fixed seat mounted within said housing with which said valve component is also adapted to cooperate to restrict the application of vacuum to the brake applying means when the trailer is unladen and vacuum is applied to said diaphragms, and hand operable means adapted to be used when the trailer is loaded to set said valve component and valve element relatively to said fixed seat to enable the whole available vacuum to be transmitted to said trailer brake applying means.

2. A device for operating the brakes of a trailer vehicle, comprising a valve housing, means for connecting said valve housing to a source of vacuum on a tractor vehicle and to trailer brake applying means, a pair of diaphragms of differential areas peripherally fixed in said housing, a valve component connecting the central portions of said diaphragms, a valve member movably mounted against spring action within said valve component, a valve seat within said valve component, a fixed valve seat external to said valve component and communicating with said source of vacuum, and hand operable means to set said valve component and valve member relatively to said fixed seat to cause application of the brakes when the trailer vehicle is loaded.

3. A device for operating the brakes of a trailer vehicle, comprising a valve housing, a pair of diaphragms of differential areas peripherally fixed in said housing and enclosing between them a space continually open to atmosphere, a cylindrical valve component connected centrally to both diaphragms, a disc valve member movably mounted within said valve component, a valve seat in said valve component, a second valve seat fixed externally of said valve component and within said housing, means for providing communication between said fixed valve seat and the diaphragm of smaller area and a source of vacuum on a tractor vehicle, means for connecting the end of said housing adjacent the diaphragm of larger area to the trailer brake mechanism, and hand operable means adapted to set said valve component and valve member relatively to said fixed seat to place the connection to the brake mechanism in free communication with the source of vacuum when the trailer vehicle is loaded.

4. A device for operating the brakes of a trailer vehicle, comprising a valve housing, a pair of diaphragms of differential areas peripherally fixed in said housing and enclosing between them a space in constant communication with atmosphere, a cylindrical valve component connected centrally to both diaphragms, a perforated disc valve member movably mounted within said valve component, a spring opposing movement of said disc valve in one direction, an annular valve seat in said valve component, a second valve seat projecting from an end wall of said housing into concentric relation with said annular valve seat, means for connecting both ends of said housing to a source of vacuum on a tractor vehicle, means for connecting the end of said housing adjacent the diaphragm of larger area to the trailer brakes, and hand operable means to move said diaphragms and valve component to an inoperative position and thereby allow full vacuum to be exerted on the trailer brakes when the vehicle is loaded.

JOHN RODWAY.